(12) United States Patent
Chou

(10) Patent No.: US 10,663,697 B2
(45) Date of Patent: *May 26, 2020

(54) OPTICAL PATH FOLDING ELEMENT, IMAGING LENS MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,828

(22) Filed: Oct. 15, 2018

(65) Prior Publication Data

US 2019/0049702 A1 Feb. 14, 2019

Related U.S. Application Data

(63) Continuation of application No. 15/292,215, filed on Oct. 13, 2016, now Pat. No. 10,133,037.

(30) Foreign Application Priority Data

Aug. 26, 2016 (TW) .............................. 105213079 U

(51) Int. Cl.
*G02B 17/00* (2006.01)
*G02B 27/12* (2006.01)
(Continued)

(52) U.S. Cl.
CPC ............ *G02B 13/0065* (2013.01); *G02B 1/04* (2013.01); *G02B 17/0856* (2013.01); *G02B 5/04* (2013.01);
(Continued)

(58) Field of Classification Search
CPC .... G02B 5/04; G02B 17/0028; G02B 17/086; G02B 17/0856; G02B 13/0065;
(Continued)

(56) References Cited

U.S. PATENT DOCUMENTS 5,786,582 A 7/1998 Roustaei et al.
7,042,659 B2 5/2006 Huang et al.
(Continued)

*Primary Examiner* — Dawayne Pinkney
(74) *Attorney, Agent, or Firm* — McClure, Qualey & Rodack, LLP

(57) ABSTRACT

An optical path folding element includes an incident surface, a path folding surface and an exiting surface. The incident surface allows a light ray to pass into the optical path folding element. The path folding surface folds the light ray from the incident surface. The exiting surface allows the light ray to pass through and depart from the optical path folding element. At least one of the incident surface and the exiting surface includes an optical effective portion and at least one engaging structure symmetrically disposed around the optical effective portion. The engaging structure includes an annular surface portion and an inclined surface portion. The annular surface portion surrounds the optical effective portion, and the inclined surface portion is located between the annular surface portion and the optical effective portion. An angle between the annular surface portion and the inclined surface portion satisfies a specific condition.

20 Claims, 12 Drawing Sheets

(51) Int. Cl.
    *G02B 5/04*         (2006.01)
    *G03B 21/00*      (2006.01)
    *G03B 21/28*      (2006.01)
    *G02B 13/00*      (2006.01)
    *G02B 1/04*        (2006.01)
    *G02B 17/08*      (2006.01)
    *G02B 6/26*        (2006.01)
    *G02B 19/00*      (2006.01)
    *G02B 23/24*      (2006.01)
    *G02B 27/01*      (2006.01)

(52) U.S. Cl.
    CPC ............... *G02B 6/26* (2013.01); *G02B 17/00* (2013.01); *G02B 17/086* (2013.01); *G02B 19/0028* (2013.01); *G02B 23/243* (2013.01); *G02B 27/0101* (2013.01)

(58) Field of Classification Search
    CPC .. G02B 17/00; G02B 23/243; G02B 27/0101; G02B 6/26; G02B 1/04; G02B 27/126; H04N 9/3197
    USPC ....... 359/726, 833–837, 850, 857, 640, 831; 353/33, 81
    See application file for complete search history.

(56) References Cited

U.S. PATENT DOCUMENTS

| | | | |
|---|---|---|---|
| 7,068,448 B2 | 6/2006 | Huang | |
| 7,088,530 B1 | 8/2006 | Recco et al. | |
| 7,554,749 B2 | 6/2009 | Eguchi et al. | |
| 7,636,208 B2 | 12/2009 | Huang | |
| 7,724,452 B2 | 5/2010 | Huang | |
| 7,755,857 B2 | 7/2010 | Yu | |
| 7,755,858 B2 | 7/2010 | Chen | |
| 7,813,058 B2 | 10/2010 | Huang | |
| 8,169,721 B2 | 5/2012 | Lin et al. | |
| 8,253,839 B2 | 8/2012 | Chang | |
| 8,342,409 B2 | 1/2013 | Handshaw et al. | |
| 8,379,331 B2 | 2/2013 | Lin et al. | |
| 8,390,945 B2 | 3/2013 | Yen | |
| 8,405,914 B2 * | 3/2013 | Yamashita | G03B 13/00 359/676 |
| 8,493,673 B2 | 7/2013 | Yen | |
| 8,830,600 B2 | 9/2014 | Chang et al. | |
| 8,876,006 B2 | 11/2014 | Vinogradov et al. | |
| 9,042,040 B2 | 5/2015 | Kim | |
| 9,250,364 B2 | 2/2016 | Hou | |
| 9,304,233 B2 | 4/2016 | Kim | |
| 9,323,030 B2 | 4/2016 | Nie et al. | |
| 9,329,355 B2 | 5/2016 | Lyu | |
| 9,372,322 B2 | 6/2016 | Yan et al. | |
| 2003/0209602 A1 | 11/2003 | Tsikos et al. | |
| 2005/0243439 A1 | 11/2005 | Tomita et al. | |
| 2010/0188551 A1 | 7/2010 | Nagaoka et al. | |
| 2014/0131596 A1 | 5/2014 | Vinogradov et al. | |
| 2015/0048165 A1 | 2/2015 | Drzymala et al. | |
| 2015/0062727 A1 | 3/2015 | Kang | |
| 2015/0092270 A1 | 4/2015 | Wang et al. | |
| 2015/0116849 A1 | 4/2015 | Hou | |
| 2015/0146310 A1 | 5/2015 | Choi | |
| 2015/0198777 A1 | 7/2015 | Yan et al. | |
| 2015/0198778 A1 | 7/2015 | Yan et al. | |
| 2015/0198785 A1 | 7/2015 | Yan et al. | |
| 2015/0260939 A1 | 9/2015 | Yan et al. | |
| 2015/0260940 A1 | 9/2015 | Yan et al. | |
| 2015/0260941 A1 | 9/2015 | Yan et al. | |
| 2015/0260942 A1 | 9/2015 | Yan et al. | |
| 2015/0260943 A1 | 9/2015 | Yan et al. | |
| 2015/0260944 A1 | 9/2015 | Yan et al. | |
| 2015/0260945 A1 | 9/2015 | Yan et al. | |
| 2015/0338617 A1 | 11/2015 | Nie et al. | |
| 2016/0147032 A1 | 5/2016 | Kim | |
| 2016/0161699 A1 | 6/2016 | Kim | |
| 2017/0131529 A1 | 5/2017 | Lu et al. | |

\* cited by examiner

OPTICAL PATH FOLDING ELEMENT, IMAGING LENS MODULE AND ELECTRONIC DEVICE

RELATED APPLICATIONS

The present application is a continuation of the application Ser. No. 15/292,215, filed on Oct. 13, 2016, now U.S. Pat. No. 10,133,037, and claims priority to Taiwan application serial number 105213079, filed Aug. 26, 2016, the entire contents of which are hereby incorporated herein by reference.

BACKGROUND

Technical Field

The present disclosure relates to an optical path folding element and imaging lens module. More particularly, the present disclosure relates to an optical path folding element and imaging lens module for an electronic device.

Description of Related Art

Due to the popularity of personal electronic products and mobile communication products having camera functionalities, such as smart phones and tablet personal computers, the demand for compact imaging lens modules has been increasing. However, conventional telephoto lens assembly is limited by surface shapes or materials of lens elements so that the volume cannot be reduced easily and price is too high, and further the application range is limited. Hence, one of the goals in the optical lens industry is to find out how to satisfy market specification and demand under the arrangement of telephoto characteristic, miniaturization and high image quality at the same time, and applicable to portable device, compact electronic device, zoom device, multiple lens assembly device and so on.

One of current solutions is favorable to utilize an optical path folding element, such as a prism, to fold and tilt an incident light ray for reducing the volume of the mechanism and an attenuation amount of the light ray efficiently. However, how to stabilize the engagement between the optical path folding element and other elements of the imaging lens module while minimizing the volume and keep a good alignment effect for providing high image quality is very important to date.

SUMMARY

According to one aspect of the present disclosure, an optical path folding element includes an incident surface, a path folding surface and an exiting surface. The incident surface allows a light ray to pass into the optical path folding element. The path folding surface folds the light ray from the incident surface. The exiting surface allows the light ray to pass through and depart from the optical path folding element. At least one of the incident surface and the exiting surface includes an optical effective portion and at least one engaging structure symmetrically disposed around the optical effective portion. The engaging structure includes an annular surface portion and an inclined surface portion. The annular surface portion surrounds the optical effective portion, and the inclined surface portion is located between the annular surface portion and the optical effective portion. An angle between the annular surface portion and the inclined surface portion is $\theta 1$, and the following condition is satisfied: 95 degrees<$\theta 1$<130 degrees.

According to another aspect of the present disclosure, an imaging lens module includes the abovementioned optical path folding element.

According to yet another aspect of the present disclosure, an electronic device includes the abovementioned imaging lens module.

According to further another aspect of the present disclosure, an optical path folding element includes an incident surface, a path folding surface and an exiting surface. The incident surface allows a light ray to pass into the optical path folding element. The path folding surface folds the light ray from the incident surface. The exiting surface allows the light ray to pass through and depart from the optical path folding element. At least one of the incident surface and the exiting surface includes an optical effective portion and at least one engaging structure symmetrically disposed around the optical effective portion. The engaging structure includes an annular surface portion and a conical surface. The annular surface portion surrounds the optical effective portion, and the conical surface is located between the annular surface portion and the optical effective portion. An angle between the annular surface portion and the conical surface is $\theta 2$, and the following condition is satisfied: 95 degrees<$\theta 2$<130 degrees.

According to still another aspect of the present disclosure, an imaging lens module includes the abovementioned optical path folding element.

According to yet another aspect of the present disclosure, an electronic device includes the abovementioned imaging lens module.

According to another aspect of the present disclosure, an imaging lens module includes the plastic barrel according to the foregoing aspect and an optical lens assembly, which is disposed in the plastic barrel and includes at least one lens element.

According to another aspect of the present disclosure, an electronic device includes the imaging lens module according to the foregoing aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
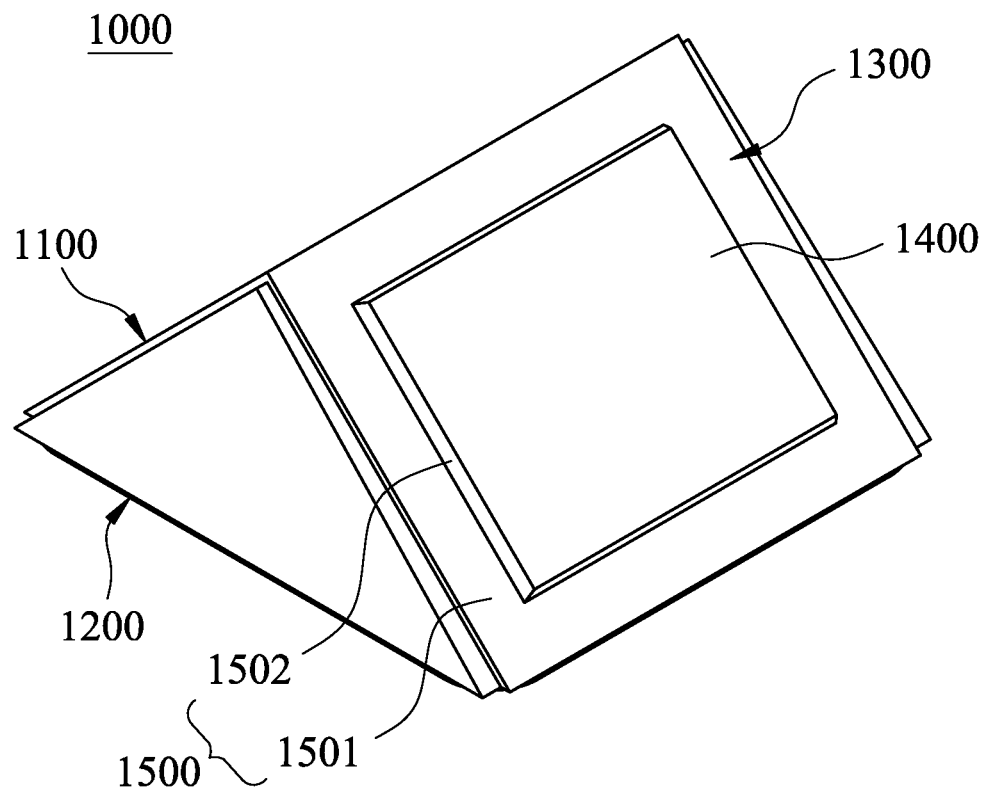
FIG. 1A is a three dimensional view of an optical path folding element according to a 1st example of the present disclosure.

The present disclosure provides an optical path folding element, and the optical path folding element includes an incident surface, a path folding surface and an exiting surface. The incident surface allows a light ray to pass into the optical path folding element. The path folding surface folds the light ray from the incident surface. The exiting surface allows the light ray to pass through and depart from the optical path folding element.

At least one of the incident surface and the exiting surface includes an optical effective portion and at least one engaging structure. The engaging structure is symmetrically disposed around the optical effective portion.

According to one embodiment of the present disclosure, the engaging structure can include an annular surface portion and an inclined surface portion. The annular surface portion surrounds the optical effective portion, and the inclined surface portion is located between the annular surface portion and the optical effective portion. When an angle between the annular surface portion and the inclined surface portion is θ1, the following condition is satisfied: 95 degrees<θ1<130 degrees. Thus, the engagement effect of the engaging structure and the alignment effect of the optical path folding element can be improved. Preferably, the following condition is satisfied: 100 degrees<θ1<120 degrees.

According to another embodiment of the present disclosure, the engaging structure can include an annular surface portion and a conical surface. Preferably, the conical surface is a closed ring for increasing the convenience of the manufacturing process.

As mentioned above, the engaging structure is not limited to be disposed on the incident surface or the exiting surface. That is, the engaging structure can be disposed on both of the two surfaces according to the needs of the following application. Furthermore, there is a step between the annular surface portion and the optical effective portion due to the configuration of the inclined surface portion. Thus, the optical path folding element can be engaged with other elements in the imaging lens module by the step for increasing the stability of the whole structure.

Moreover, the optical path folding element can be made of a plastic material and is suitable to be applied in the imaging lens module which is non wide-angle and has the demand of compact size.

In particular, the optical path folding element can be made of a materiel with a lower Abbe number, such as the EP series of Mitsubishi gas chemical company, Inc (MGC) or the SP series of Teijin. Common optical plastic materials, such as the OKP series of Osaka gas chemical (OGC), also can be used in the present disclosure.

In the present disclosure, when the Abbe number of the optical path folding element is V, the following condition is satisfied: V<32.0. Thus, differences between deflection paths of light rays, which have different wavelengths, in visible spectrum can be reduced. Preferably, the following condition is satisfied: V<25.0.

In addition, the path folding surface of the present disclosure can include a metallic layer covered thereon for folding the light ray from the incident surface. Preferably, the metallic layer is an aluminum metallic layer suitable for applying to an optical system with imaging demands. The aluminum metallic layer is cheaper so that it is favorable for reducing the cost in the following application. Furthermore, the light ray is folded by 90 degrees when passing through the path folding surface for simplifying the optical structure. Moreover, a distance between a center of the incident surface and a center of the path folding surface can be equal to a distance between the center of the path folding surface and a center of the exiting surface. Accordingly, the optical path folding element can further fit the requests of the optical design, and thus, it will reduce the opportunities of sacrificing the optical specifications under the specific condition.

In details, an area occupied by the optical effective portion is equal to or more than 40% of a total area of the incident surface or the exiting surface for expanding the light absorption range and maintaining the requirements for high resolution and image quality of present compact imaging lens modules. In addition, the optical effective portion can be a plane, spherical or aspheric area. Moreover, the appearance of the optical effective portion can be polygon-shaped, such as rectangular or octagonal.

When a width of the abovementioned inclined surface portion is L1, the following condition is satisfied: 0.07 mm<L1<0.35 mm. Thus, the stability of the engagement between the optical path folding element and other elements of the imaging lens module can be enhanced while compact size of the optical path folding element is maintained. In another embodiment of the present disclosure, when a width of the conical surface is L2, the following condition is satisfied: 0.07 mm<L2<0.35 mm.

The present disclosure further provides an imaging lens module including the optical path folding element according to any one of the two embodiments as mentioned above. The optical path folding element can be engaged with at least one lens element or an opaque member of the imaging lens module through the engaging structure thereof. When the optical path folding element is engaged with the lens element, the optical path folding element can be aligned to an optical axis of the lens element for increasing the optical accuracy and maintaining high image quality. When the optical path folding element is engaged with the opaque member, the stability of the whole imaging lens module can be increased, and image quality of the imaging lens module will not be affected due to the collision in the external environment. In particular, the opaque member can be but not limited to a cover, a base or a barrel of the imaging lens module. Furthermore, the imaging lens module can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

Accordingly, an electronic device is further provided in the present disclosure for satisfying the requirements for high resolution and image quality of present compact imaging lens modules. Preferably, the electronic device can further include but not limited to a display, a control unit, a storage unit, a random access memory unit (RAM) or a read-only memory unit (ROM) or a combination thereof.

According to the aforementioned embodiments, a plurality of examples are provided in cooperated with figures for details.

1st Embodiment

Figure 1B:
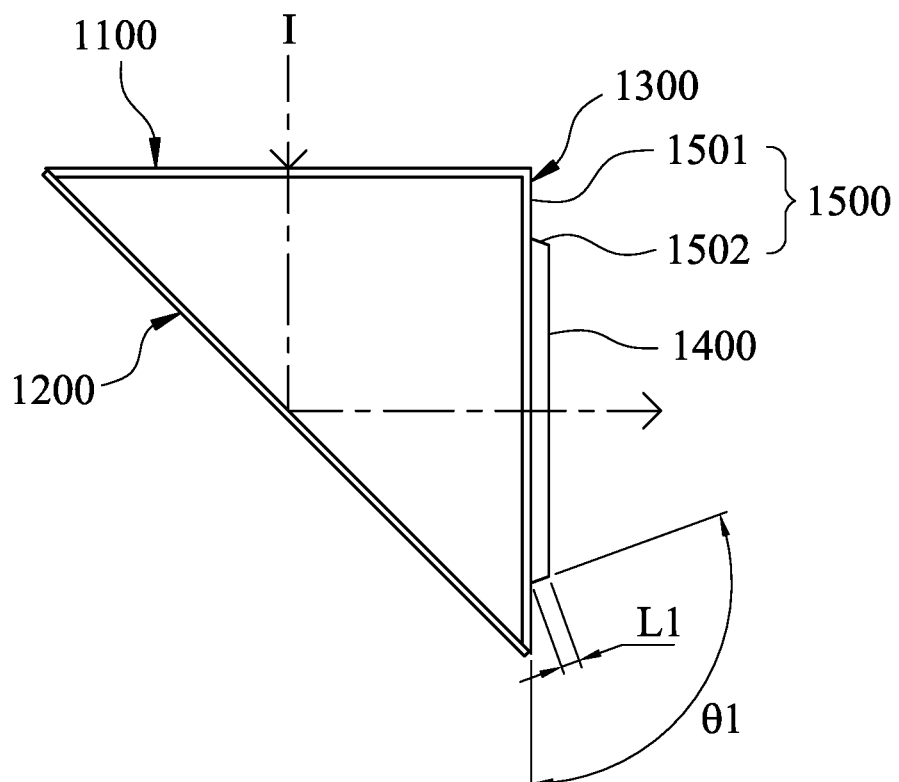
FIG. 1B is a cross-sectional view of the optical path element according to the 1st example of the present disclosure.

Please refer to FIG. 1A and FIG. 1B. FIG. 1A is a three dimensional view of an optical path folding element 1000 according to a 1st example of the present disclosure, and FIG. 1B is a cross-sectional view of the optical path folding element 1000 according to the 1st example of the present disclosure. As shown in FIG. 1A, the optical path folding element 1000 of the 1st example includes an incident surface 1100, a path folding surface 1200 and an exiting surface 1300. The light ray I passes through the incident surface 1100 to enter the optical path folding element 1000. After passing through the path folding surface 1200, the light ray I has a folding angle of 90 degrees and passes through the exiting surface 1300 to depart from the optical path folding element 1000.

In particular, the optical path folding element 1000 is a triangular prism, and the optical path folding element 1000 is made of a plastic material. Thereby, the optical path folding element 100 can be applied in an imaging lens module which has the demand of compact size.

In the 1st example, the exiting surface 1300 of the optical path folding element 1000 includes an optical effective portion 1400 and an engaging structure 1500. The engaging structure 1500 includes an annular surface portion 1501 and an inclined surface portion 1502. As shown in FIG. 1A, the optical effective portion 1400 is a rectangular-shaped portion. The annular surface portion 1501 is symmetrically disposed around the optical effective portion 1400, that is, the annular surface portion 1501 surrounds the optical effective portion 1400 continuously. The inclined surface portion 1502 is located between the annular surface portion 1501 and the optical effective portion 1400. More particularly, the inclined surface portion 1502 includes four trapezoidal surfaces corresponding to the optical effective portion 1400 which is the rectangular-shaped portion. Each of the four trapezoidal surfaces is located between each side of the optical effective portion 1400 and the annular surface portion 1501, respectively.

As shown in FIG. 1B, the annular surface portion 1501 and the exiting surface 1300 are coplanar. The optical effective portion 1400 and the inclined surface portion 1502 protrude from the exiting surface 1300, that is, there is a step between the optical effective portion 1400 and the annular surface portion 1501 due to the configuration of the inclined surface portion 1502. Accordingly, as shown in the cross-sectional view of the optical path folding element 1000, the exiting surface 1300, the optical effective portion 1400 and the inclined surface portion 1502 form a trapezoid protrusion. A top surface of the trapezoid protrusion is the optical effect portion 1400, and a sidewall of the trapezoid protrusion is one of the trapezoidal surfaces of the inclined surface portion 1502. Preferably, an angle between the annular surface portion 1501 and the inclined surface portion 1502 is θ1, and a width of the inclined surface portion 1502 is L1. When the angle θ1 and the width L1 of the inclined surface portion 1502 satisfy a specific condition, the engagement effect of the engaging structure 1500 and the alignment effect of the optical path folding element 1000 can be improved for maintaining high structural stability and image quality under the request of miniaturization.

Please refer to Table 1 as follows, the conditions, such as the material and the Abbe number of the optical path folding element 1000, a ratio between an area occupied by the optical effective portion 1400 and a total area of the exiting surface 1300, the angle θ1 between the annular surface portion 1501 and the inclined surface portion 1502 and the width L1 of the inclined surface portion 1502, are listed therein.

TABLE 1

| (1st Example) | |
|---|---|
| Abbe number | 20.4 |
| Material | Plastic |
| Manufactor/Product series | MGC/EP |
| Ratio between an area occupied by optical effective portion and a total area of exiting surface (%) | 50 |
| θ1 (degrees) | 110 |
| L1 (mm) | 0.21 |

The engaging structure 1500 can be manufactured through an injection molding process by a mold, which has an appearance corresponding to the abovementioned features of the engaging structure 1500, at the same time with the optical path folding element 1000. The engaging structure 1500 of the optical path folding element 1000 also can be manufactured by pasting a trapezoid protrusion on the exiting surface 1300, and preferably the materials of the trapezoid protrusion can be the same with the materials of the optical path folding element 1000. However, the manufacturing process of the optical path folding element 1000 is not the main feature of the present disclosure and will not be further described herein.

2nd Example

Figure 2A:
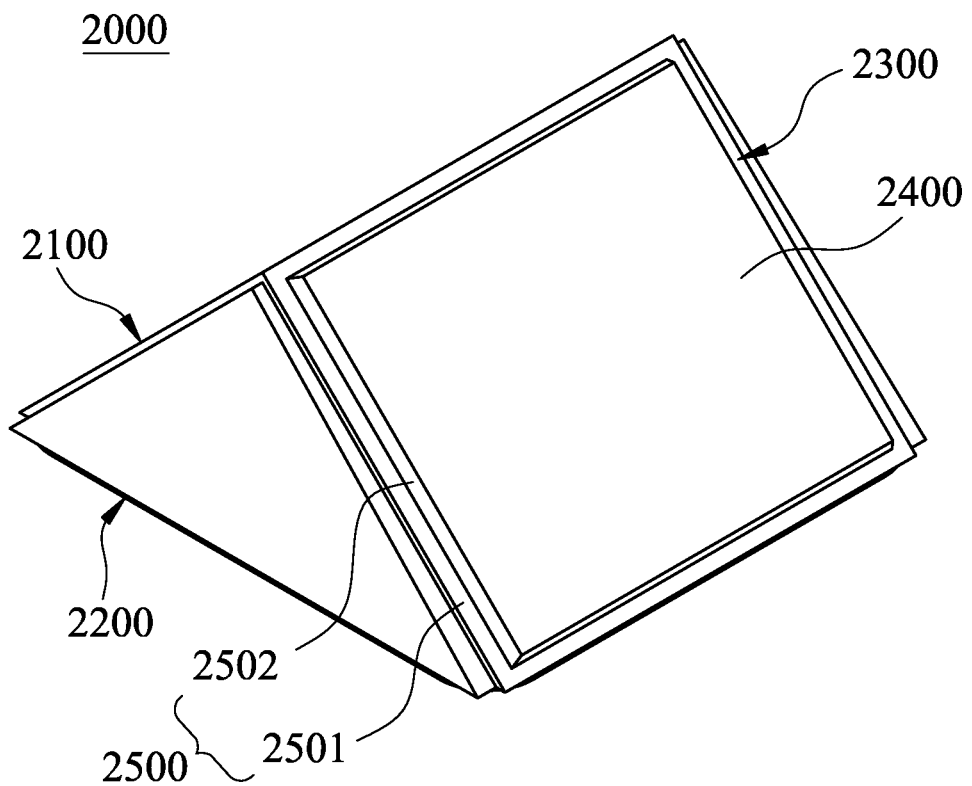
FIG. 2A is a three dimensional view of an optical path folding element according to a 2nd example of the present disclosure.
Figure 2B:
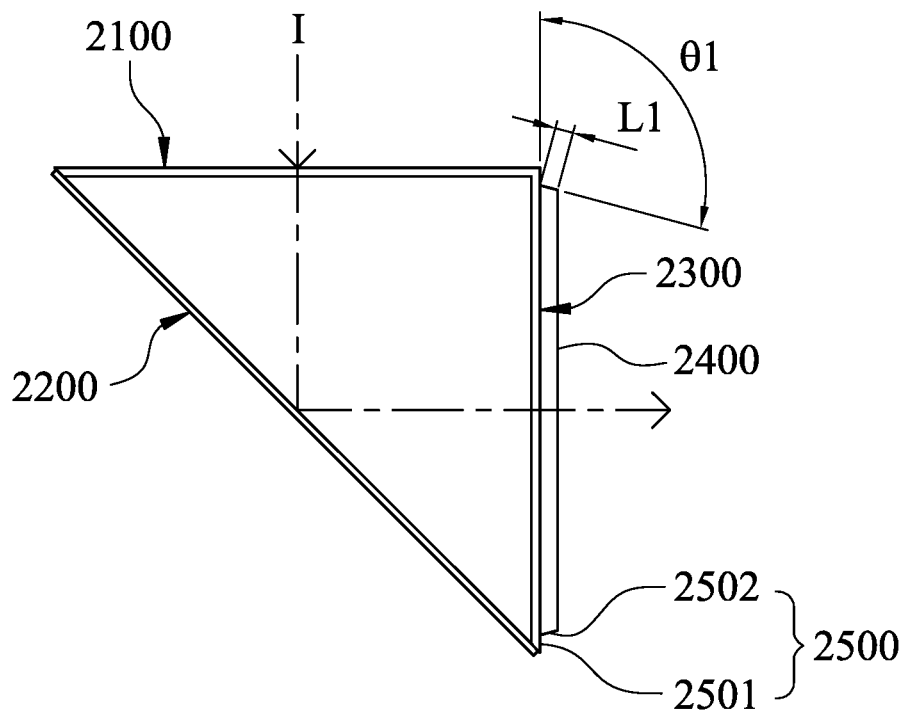
FIG. 2B is a cross-sectional view of the optical path element according to the 2nd example of the present disclosure.

Please refer to FIG. 2A and FIG. 2B. FIG. 2A is a three dimensional view of an optical path folding element 2000 according to a 2nd example of the present disclosure, and FIG. 2B is a cross-sectional view of the optical path element 2000 according to the 2nd example of the present disclosure. As shown in FIG. 2A, the optical path folding element 2000 of the 2nd example is a triangular prism and includes an incident surface 2100, a path folding surface 2200 and an exiting surface 2300. The light ray I passes through the incident surface 2100 to enter the optical path folding element 2000. After passing through the path folding surface 2200, the light ray I has a folding angle of 90 degrees and passes through the exiting surface 2300 to depart from the optical path folding element 2000.

In the 2nd example, the exiting surface 2300 of the optical path folding element 2000 includes an optical effective portion 2400 and an engaging structure 2500. In particular, the optical effective portion 2400 is a rectangular-shaped portion. The engaging structure 2500 includes an annular surface portion 2501 and an inclined surface portion 2502. The annular surface portion 2501 is symmetrically disposed around the optical effective portion 2400, that is, the annular surface portion 2501 surrounds the optical effective portion 2400 continuously. The inclined surface portion 2502 is located between the annular surface portion 2501 and the optical effective portion 2400. More particularly, the inclined surface portion 2502 includes four trapezoidal surfaces corresponding to the optical effective portion 2400 which is the rectangular-shaped portion. Each of the four trapezoidal surfaces is located between each side of the optical effective portion 2400 and the annular surface portion 2501, respectively.

As shown in FIG. 2B, the annular surface portion 2501 and the exiting surface 2300 are coplanar. The optical effective portion 2400 and the inclined surface portion 2502 protrude from the exiting surface 2300, and therefore, there is a step between the optical effective portion 2400 and the annular surface portion 2501 due to the configuration of the inclined surface portion 2502. Accordingly, as shown in the cross-sectional view of the optical path folding element 2000, the exiting surface 2300, the optical effective portion 2400 and the inclined surface portion 2502 form a trapezoid protrusion. A top surface of the trapezoid protrusion is the optical effect portion 2400, and a sidewall of the trapezoid protrusion is one of the trapezoidal surfaces of the inclined surface portion 2502. Preferably, an angle between the annular surface portion 2501 and the inclined surface portion 2502 is θ1, and a width of the inclined surface portion 2502 is L1. When the angle θ1 and the width L1 of the inclined surface portion 2502 satisfy a specific condition, the engagement effect of the engaging structure 2500 and the alignment effect of the optical path folding element 2000 can be improved for maintaining high structural stability and image quality under the request of miniaturization.

Please refer to Table 2, the conditions, such as the material and the Abbe number of the optical path folding element 2000, a ratio between an area occupied by the optical effective portion 2400 and a total area of the exiting surface 2300, the angle θ1 between the annular surface portion 2501 and the inclined surface portion 2502 and the width L1 of the inclined surface portion 2502, are listed therein.

TABLE 2

(2nd Example)

| | |
|---|---|
| Abbe number | 19.5 |
| Material | Plastic |
| Manufactor/Product series | MGC/EP |
| Ratio between an area occupied by optical effective portion and a total area of exiting surface (%) | 82 |
| θ1 (degrees) | 105 |
| L1 (mm) | 0.21 |

As shown in Table 2, it is different from the 1st example that a ratio between an area occupied by the optical effective portion 2400 and a total area of the exiting surface 2300 is θ2% to increase the light absorption range efficiently for satisfying the requirements for high resolution and image quality of present compact optical elements.

3rd Example

Figure 3A:
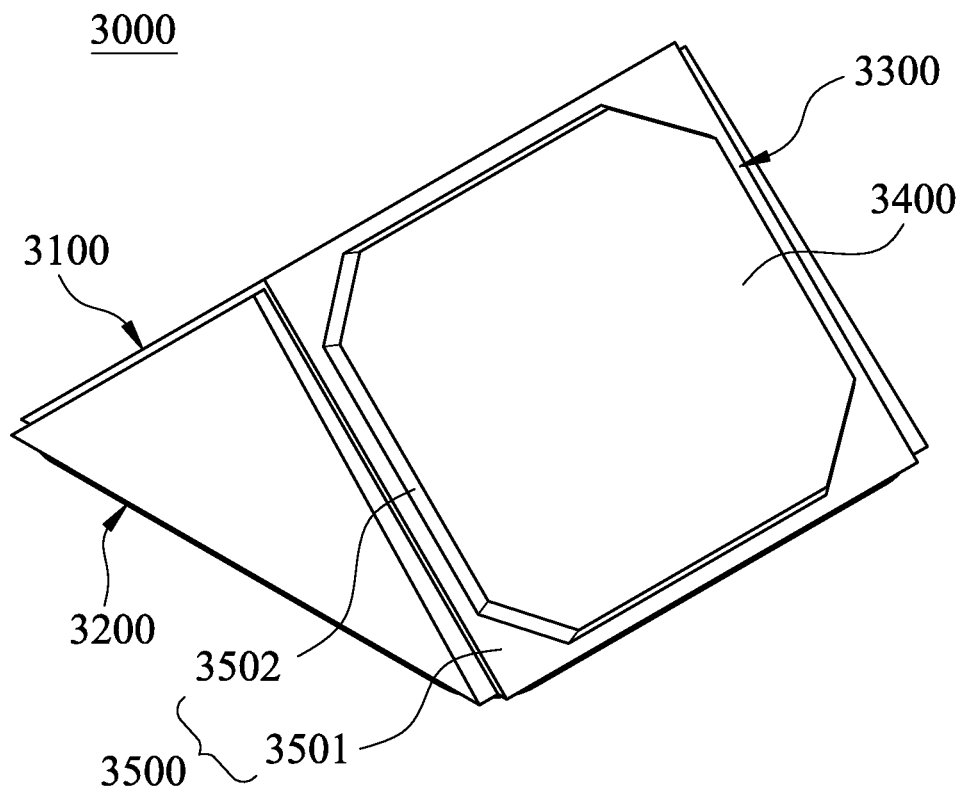
FIG. 3A is a three dimensional view of an optical path folding element according to a 3rd example of the present disclosure.
Figure 3B:
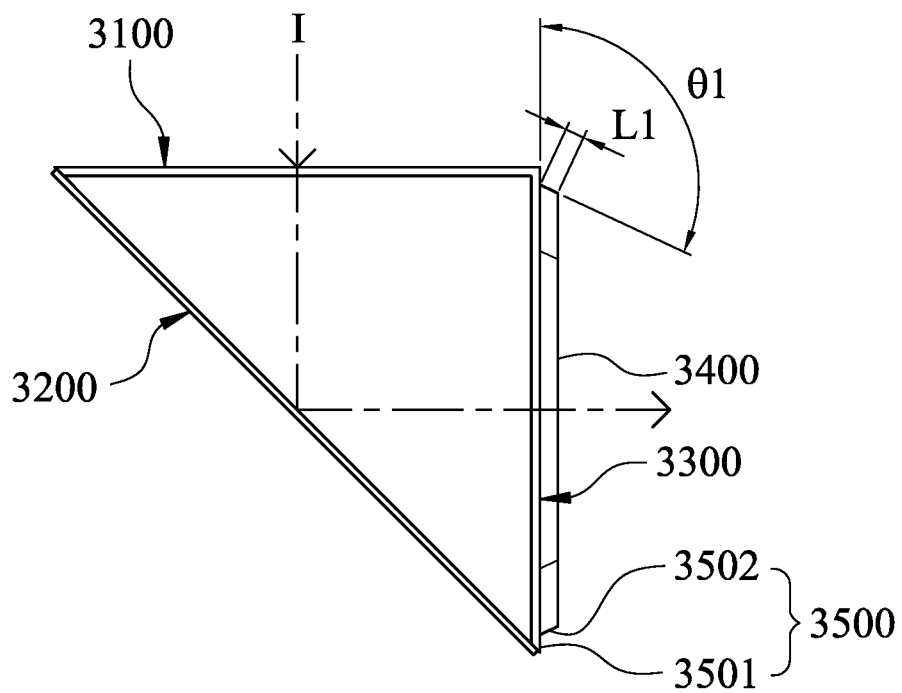
FIG. 3B is a cross-sectional view of the optical path element according to the 3rd example of the present disclosure.

Please refer to FIG. 3A and FIG. 3B. FIG. 3A is a three dimensional view of an optical path folding element 3000 according to a 3rd example of the present disclosure, and FIG. 3B is a cross-sectional view of the optical path element 3000 according to the 3rd example of the present disclosure. As shown in FIG. 3A, the optical path folding element 3000 of the 3rd example is a triangular prism and includes an incident surface 3100, a path folding surface 3200 and an exiting surface 3300. The light ray I passes through the incident surface 3100 to enter the optical path folding element 3000. After passing through the path folding surface 3200, the light ray I has a folding angle of 90 degrees and passes through the exiting surface 3300 to depart from the optical path folding element 3000.

In the 3rd example, the exiting surface 3300 of the optical path folding element 3000 includes an optical effective portion 3400 and an engaging structure 3500. It is different from the 1st example that the optical effective portion 3400 is an octagonal-shaped portion. The engaging structure 3500 includes an annular surface portion 3501 and an inclined surface portion 3502. The annular surface portion 3501 is symmetrically disposed around the optical effective portion 3400, that is, the annular surface portion 3501 surrounds the optical effective portion 3400 continuously. The inclined surface portion 3502 is located between the annular surface portion 3501 and the optical effective portion 3400. More particularly, the inclined surface portion 3502 includes eight trapezoidal surfaces corresponding to the optical effective portion 3400 which is the octagonal-shaped portion. Each of the eight trapezoidal surfaces is located between each side of the optical effective portion 3400 and the annular surface portion 3501, respectively.

As shown in FIG. 3B, the annular surface portion 3501 and the exiting surface 3300 are coplanar. The optical effective portion 3400 and the inclined surface portion 3502 protrude from the exiting surface 3300, and therefore, there is a step between the optical effective portion 3400 and the annular surface portion 3501 due to the configuration of the inclined surface portion 3502. Preferably, an angle between the annular surface portion 3501 and the inclined surface portion 3502 is θ1, and a width of the inclined surface portion 3502 is L1. When the angle θ1 and the width L1 of the inclined surface portion 3502 satisfy a specific condition, the engagement effect of the engaging structure 3500 and the alignment effect of the optical path folding element 3000 can be improved for maintaining high structural stability and image quality under the request of miniaturization.

Please refer to Table 3, the conditions, such as the material and the Abbe number of the optical path folding element 3000, a ratio between an area occupied by the optical effective portion 3400 and a total area of the exiting surface 3300, the angle θ1 between the annular surface portion 3501 and the inclined surface portion 3502 and the width L1 of the inclined surface portion 3502, are listed therein.

TABLE 3

(3rd Example)

| | |
|---|---|
| Abbe number | 23.4 |
| Material | Plastic |
| Manufactor/Product series | OGC/OKP |
| Ratio between an area occupied by optical effective portion and a total area of exiting surface (%) | 79 |
| θ1 (degrees) | 115 |
| L1 (mm) | 0.22 |

As shown in Table 3, it is different from the 1st example that a ratio between an area occupied by the optical effective portion 3400 and a total area of the exiting surface 3300 is 79% to increase the light absorption range efficiently for satisfying the requirements for high resolution and image quality of present compact optical elements. Moreover, in the 3rd example, the angle θ1 between the annular surface portion 3501 and the inclined surface portion 3502 is larger than that of the 1st example so that the stability of the whole imaging lens module using thereof will be enhanced.

4th Example

Figure 4A:
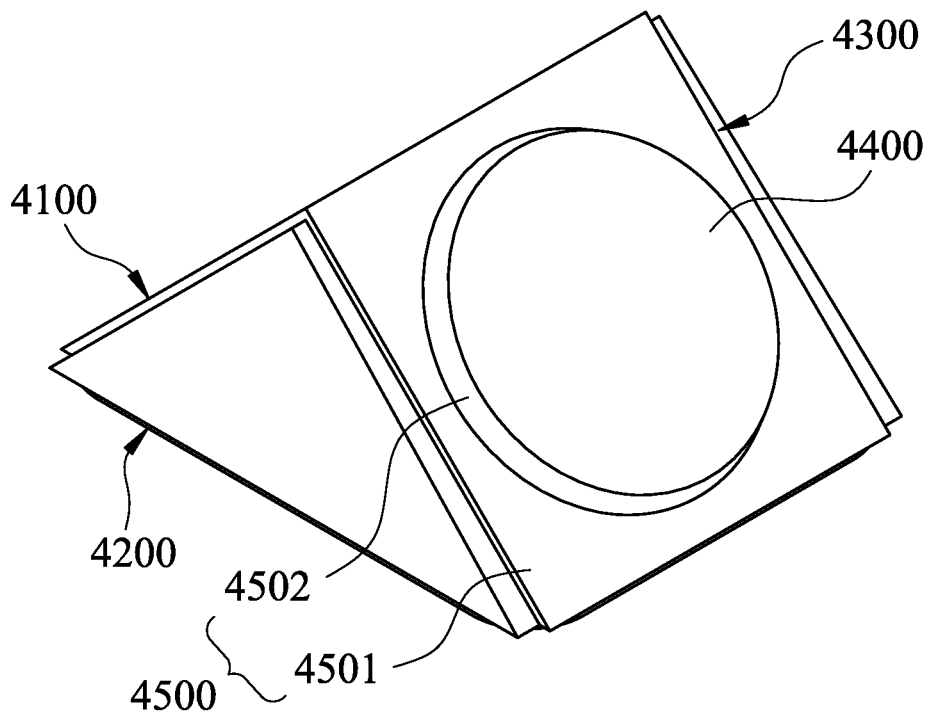
FIG. 4A is a three dimensional view of an optical path folding element according to a 4th example of the present disclosure.
Figure 4B:
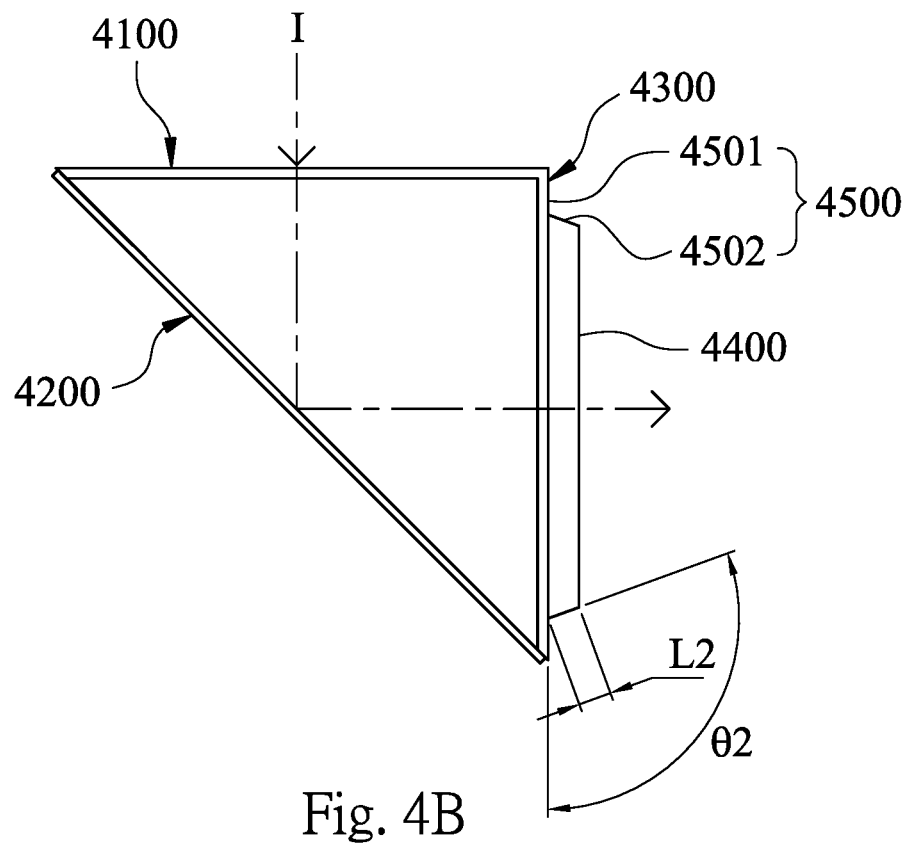
FIG. 4B is a cross-sectional view of the optical path element according to the 4th example of the present disclosure.

Please refer to FIG. 4A and FIG. 4B. FIG. 4A is a three dimensional view of an optical path folding element 4000 according to a 4th example of the present disclosure, and FIG. 4B is a cross-sectional view of the optical path element 4000 according to the 4th example of the present disclosure. As shown in FIG. 4A, the optical path folding element 4000 of the 4th example is a triangular prism and includes an incident surface 4100, a path folding surface 4200 and an exiting surface 4300. The light ray I passes through the incident surface 4100 to enter the optical path folding element 4000. After passing through the path folding surface 4200, the light ray I has a folding angle of 90 degrees and passes through the exiting surface 4300 to depart from the optical path folding element 4000.

In the 4th example, the exiting surface 4300 of the optical path folding element 4000 includes an optical effective portion 4400 and an engaging structure 4500. The optical effective portion 4400 of the 4th example is a circular-shaped portion, and further, the engaging structure 4500 includes an annular surface portion 4501 and a conical surface 4502. The annular surface portion 4501 surrounds the optical effective portion 4400, and the conical surface 4502 is located between the annular surface portion 4501 and the optical effective portion 4400. Preferably, the conical surface 4502 is a closed ring for increasing the convenience of the manufacturing process.

As shown in FIG. 4B, the annular surface portion 4501 and the exiting surface 4300 are coplanar. The optical effective portion 4400 and the conical surface 4502 protrude from the exiting surface 4300, and therefore, there is a step between the optical effective portion 4400 and the annular surface portion 4501 due to the configuration of the conical surface 4502. Preferably, an angle between the annular surface portion 4501 and the conical surface 4502 is θ2, and a width of the conical surface 4502 is L2. When the angle θ2 and the width L2 of the conical surface 4502 satisfy a specific condition, the engagement effect of the engaging structure 4500 and the alignment effect of the optical path folding element 4000 can be improved for maintaining high structural stability and image quality under the request of miniaturization.

Please refer to Table 4, the conditions, such as the material and the Abbe number of the optical path folding element 4000, a ratio between an area occupied by the optical effective portion 4400 and a total area of the exiting surface 4300, the angle θ2 between the annular surface portion 4501 and the conical surface 4502 and the width L2 of the conical surface 4502, are listed therein.

TABLE 4

| (4th Example) | |
|---|---|
| Abbe number | 23.3 |
| Material | Plastic |
| Manufactor/Product series | Teijin/SP |

TABLE 4-continued

| (4th Example) | |
|---|---|
| Ratio between an area occupied by optical effective portion and a total area of exiting surface (%) | 45 |
| Θ2 (degrees) | 110 |
| L2 (mm) | 0.32 |

5th Example

Figure 5A:
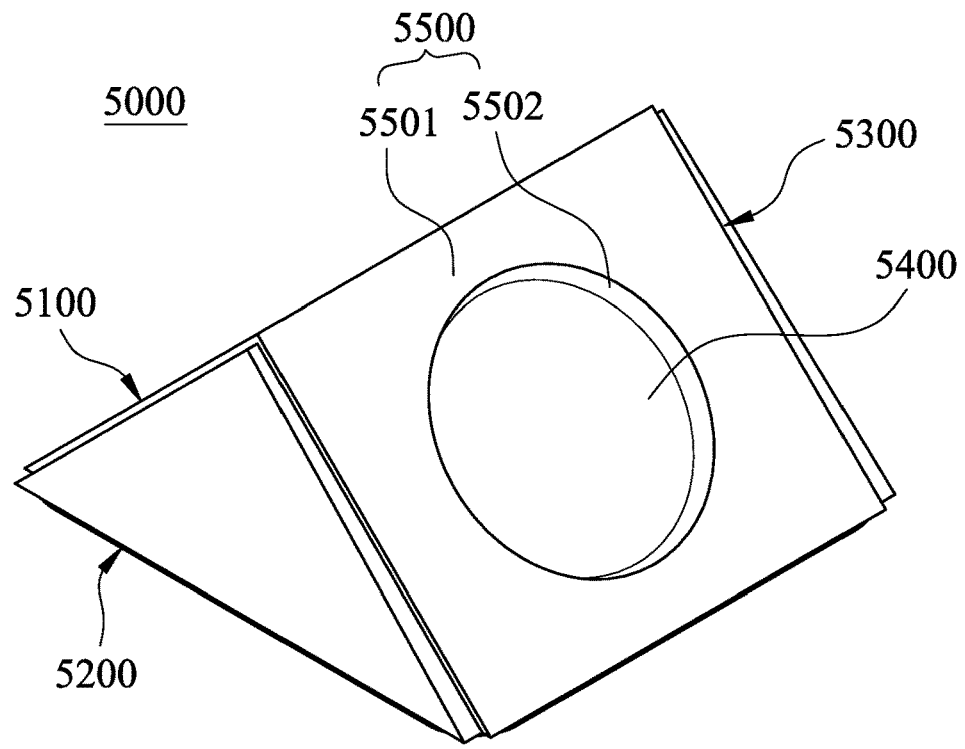
FIG. 5A is a three dimensional view of an optical path folding element according to a 5th example of the present disclosure.
Figure 5B:
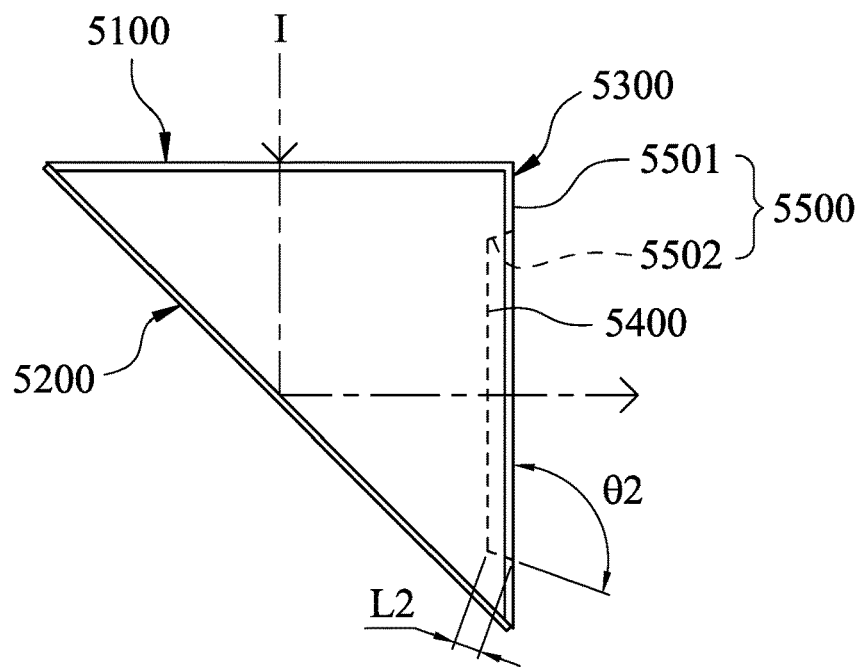
FIG. 5B is a cross-sectional view of the optical path element according to the 5th example of the present disclosure.

Please refer to FIG. 5A and FIG. 5B. FIG. 5A is a three dimensional view of an optical path folding element 5000 according to a 5th example of the present disclosure, and FIG. 5B is a cross-sectional view of the optical path element 5000 according to the 5th example of the present disclosure. As shown in FIG. 5A, the optical path folding element 5000 of the 5th example is a triangular prism and includes an incident surface 5100, a path folding surface 5200 and an exiting surface 5300. The light ray I passes through the incident surface 5100 to enter the optical path folding element 5000. After passing through the path folding surface 5200, the light ray I has a folding angle of 90 degrees and passes through the exiting surface 5300 to depart from the optical path folding element 5000.

In the 5th example, the exiting surface 5300 of the optical path folding element 5000 includes an optical effective portion 5400 and an engaging structure 5500. In particular, the optical effective portion 5400 of the 5th example is a circular-shaped portion. The engaging structure 5500 includes an annular surface portion 5501 and a conical surface 5502. Moreover, the annular surface portion 5501 surrounds the optical effective portion 5400, and the conical surface 5502 is located between the annular surface portion 5501 and the optical effective portion 5400. Preferably, the conical surface 5502 is a closed ring for increasing the convenience of the manufacturing process.

As shown in FIG. 5B, the annular surface portion 5501 and the exiting surface 5300 are also coplanar. However, the optical effective portion 5400 and the conical surface 5502 are recessed into the exiting surface 5300 for further minimizing an occupied space of the optical path folding element 5000 and satisfying the demand of compact size. In details, the optical path folding element 5000 has a circular recess formed on the exiting surface 5300. A bottom surface of the circular recess is the optical effective portion 5400, and further, a sidewall of the circular recess is the conical surface 5502. Preferably, an angle between the annular surface portion 5501 and the conical surface 5502 is θ2, and a width of the conical surface 5502 is L2. When the angle θ2 and the width L2 of the conical surface 5502 satisfy a specific condition, the engagement effect of the engaging structure 5500 and the alignment effect of the optical path folding element 5000 can be improved for maintaining the high structural stability and image quality under the request of miniaturization.

Please refer to Table 5, the conditions, such as the material and the Abbe number of the optical path folding element 5000, a ratio between an area occupied by the optical effective portion 5400 and a total area of the exiting surface 5300, the angle θ2 between the annular surface portion 5501 and the conical surface 5502 and the width L2 of the conical surface 5502, are listed therein.

TABLE 5

(5th Example)

| | |
|---|---|
| Abbe number | 21.4 |
| Material | Plastic |
| Manufactor/Product series | OGC/OKP |
| Ratio between an area occupied by optical effective portion and a total area of exiting surface (%) | 29 |
| Θ2 (degrees) | 110 |
| L2 (mm) | 0.32 |

6th Example

Figure 6:
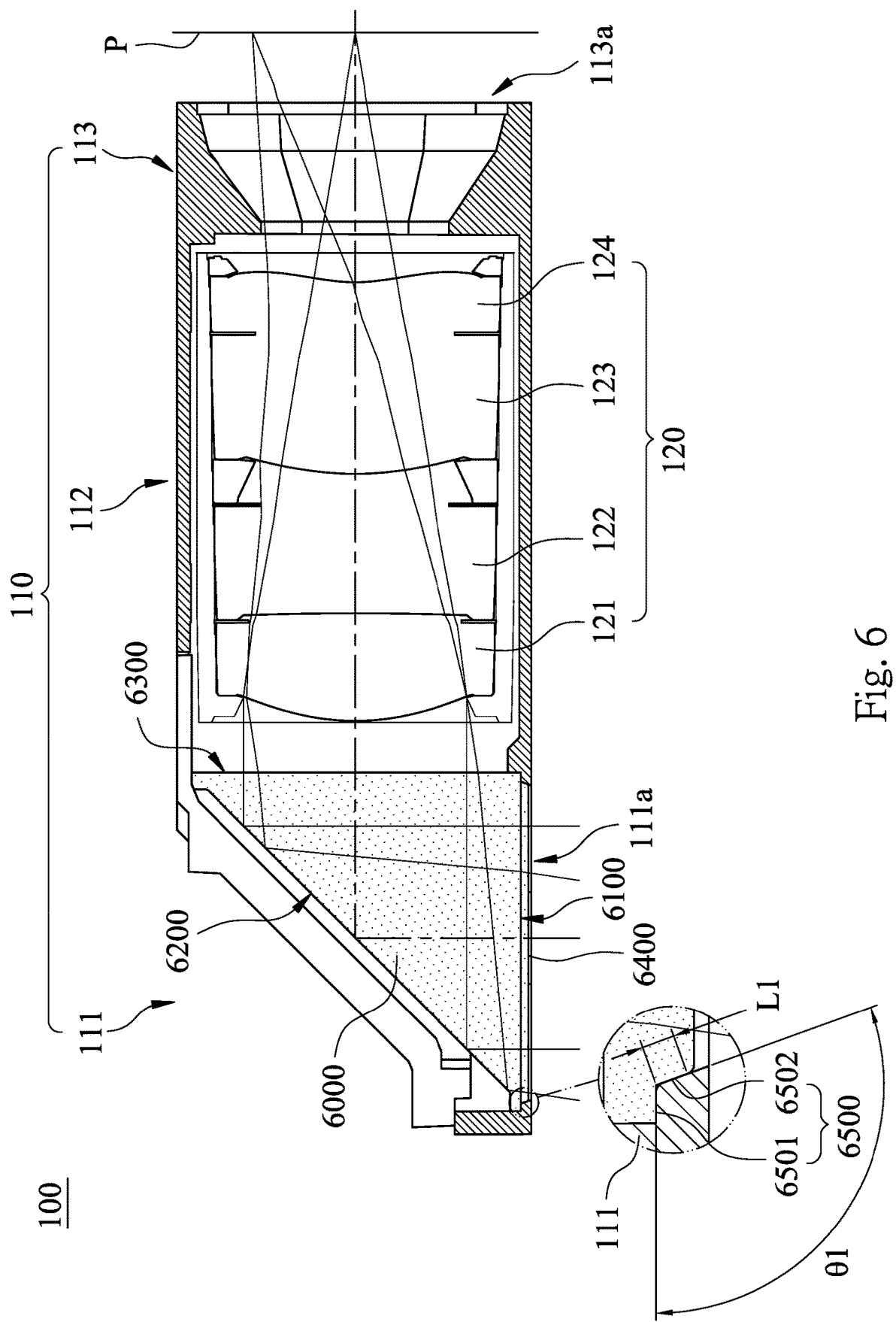
FIG. 6 is a cross-sectional view of an imaging lens module according to a 6th example of the present disclosure.

Please refer to FIG. 6, which is a cross-sectional view of an imaging lens module 100 according to a 6th example of the present disclosure. As shown in FIG. 6, the imaging lens module 100 includes an opaque member 110, an optical lens assembly 120 and an optical path folding element 6000. The optical lens assembly 120 and the optical path folding element 6000 are located inside the opaque member 110.

In the 6th example, the opaque member 110 is a cover of the imaging lens module 100 for protecting the assembled elements from being affected by the external environment. In particular, the opaque member 110 includes an object-end portion 111, a tube portion 112 and an image-end portion 113. The object-end portion 111 includes an object-end opening 111a, and the image-end portion 113 includes an image-end opening 113a.

In details, the object-end portion 111 faces toward an imaged object (not shown herein) and is provided for disposing the optical path folding element 6000 therein. The tube portion 112 is provided for disposing a plurality of lens elements therein, and the image-end portion 113 is closest to an image surface P in the imaging lens module 100.

In the 6th example, the optical lens assembly 120 includes, in order from the object-end portion 111 to the image-end portion 113 along an optical axis, a first lens element 121, a second lens element 122, a third lens element 123 and a fourth lens element 124.

In addition, the lens element of the optical lens assembly 120 can be made of plastic or glass materials. When the lens element is made of the plastic material, manufacturing costs can be effectively reduced. When the lens elements are made of glass materials, the distribution of the refractive power of the optical photographing assembly may be more flexible to design. Moreover, the optical lens assembly 120 can include other optical elements (their reference numerals are omitted), such as spacers, light blocking sheets and so on.

According to FIG. 6, the structure of the optical path folding element 6000 of the 6th example is approximately the same with the 1st example, the 2nd example and the 3rd example. That is, the optical path folding element 6000 is a triangular prism and includes an incident surface 6100, a path folding surface 6200 and an exiting surface 6300. Accordingly, the light ray passes through the object-end opening 111a and the incident surface 6100 to enter the optical path folding element 6000, which is located in the object-end portion 111. After passing through the path folding surface 6200, the folded light ray departs from the optical path folding element 6000 through the exiting surface 6300 and then enters into the optical lens assembly 120, which is located in the tube portion 112. Finally, the light ray departs from the optical lens assembly 120 and passes through the image-end opening 113a to image on the image surface P.

The difference of the 6th example is that the incident surface 6100 of the optical path folding element 6000 includes an optical effective portion 6400 and an engaging structure 6500. In particular, the engaging structure 6500 includes an annular surface portion 6501 and an inclined surface portion 6502. The inclined surface portion 6502 is located between the annular surface portion 6501 and the optical effective portion 6400. Thus, there is a step between the optical effective portion 6400 and the annular surface portion 6501 due to the configuration of the inclined surface portion 6502.

As shown in a partial enlarged view of FIG. 6, the optical path folding element 6000 is engaged with two sides of the object-end opening 111a of the opaque member 110 through the step which is between the optical effective portion 6400 and the annular surface portion 6501. The two sides of the object-end opening 111a can further include at least one engaging member (not shown herein) for stabilizing the engagement between the optical path folding element 6000 and the opaque member 110. Furthermore, an angle θ1 between the annular surface portion 6501 and the inclined surface portion 6502 is 105 degrees, and a width L1 of the inclined surface portion 6502 is 0.11 mm. Thus, the stability of the whole structure can be enhanced by the engagement between the engaging structure 6500 of the optical path folding element 6000 and the opaque member 110.

7th Example

Figure 7:
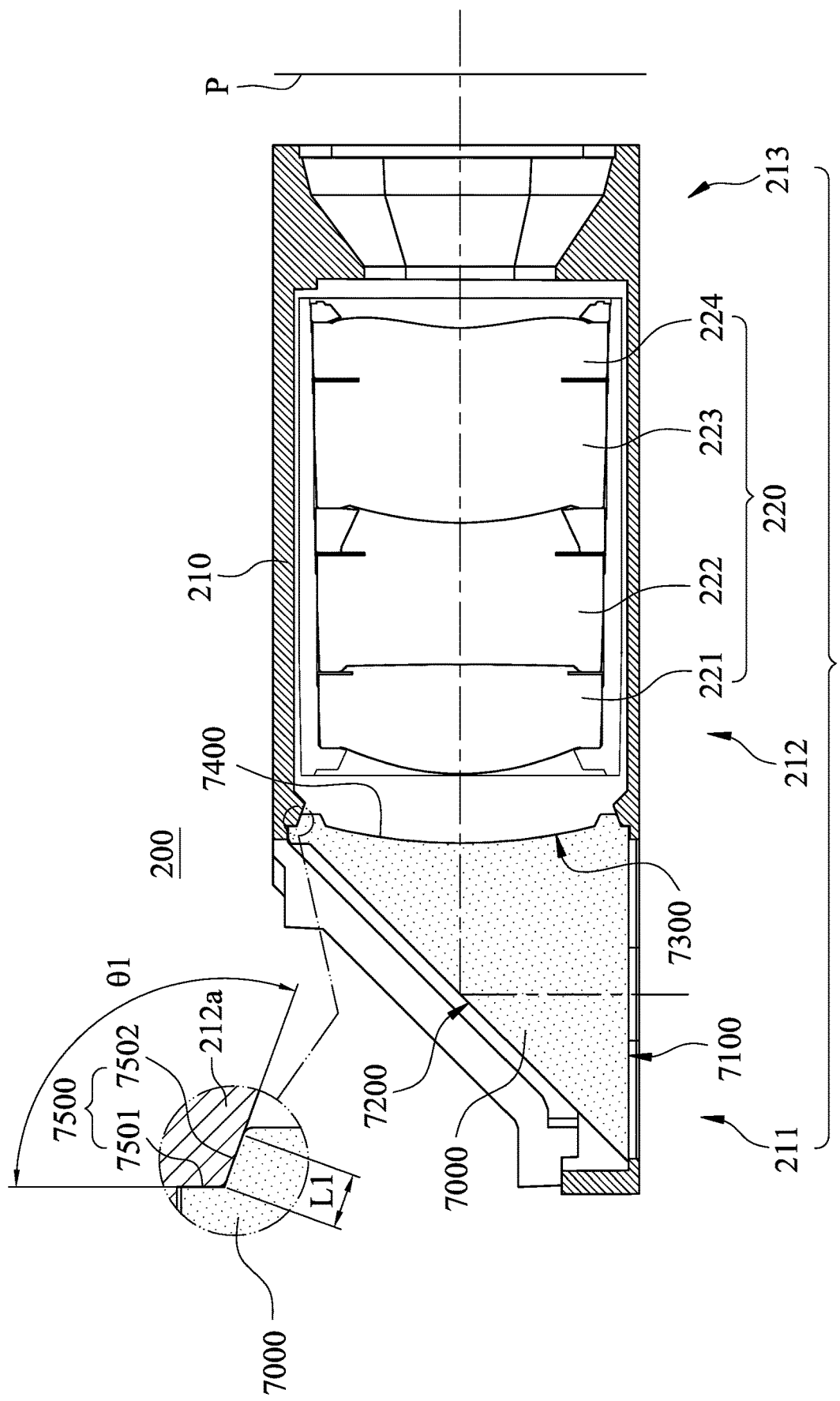
FIG. 7 is a cross-sectional view of an imaging lens module according to a 7th example of the present disclosure.

Please refer to FIG. 7, which is a cross-sectional view of an imaging lens module 200 according to a 7th example of the present disclosure. As shown in FIG. 7, the imaging lens module 200 includes an opaque member 210, an optical lens assembly 220 and an optical path folding element 7000. The optical lens assembly 220 and the optical path folding element 7000 are located inside the opaque member 210.

In the 7th example, the opaque member 210 is a cover of the imaging lens module 200 for protecting the assembled elements from being affected by the external environment. In particular, the opaque member 210 includes an object-end portion 211, a tube portion 212 and an image-end portion 213.

In details, the object-end portion 211 faces toward an imaged object (not shown herein) and is provided for disposing the optical path folding element 7000 therein. The tube portion 212 is provided for disposing a plurality of lens elements therein, and the image-end portion 213 is closest to an image surface P in the imaging lens module 200.

In the 7th example, the optical lens assembly 220 includes, in order from the object-end portion 211 to the image-end portion 213 along an optical axis, a first lens element 221, a second lens element 222, a third lens element 223 and a fourth lens element 224. The optical lens assembly 220 can include other optical elements (their reference numerals are omitted), such as spacers, light blocking sheets and so on.

As shown in FIG. 7, the structure of the optical path folding element 7000 of the 7th example is approximately the same with the 1st example, the 2nd example and the 3rd example. That is, the optical path folding element 7000 is a triangular prism and includes an incident surface 7100, a path folding surface 7200 and an exiting surface 7300. Moreover, the exiting surface 7300 of the optical path folding element 7000 includes an optical effective portion 7400 and an engaging structure 7500. The engaging structure 7500 includes an annular surface portion 7501 and an inclined surface portion 7502. In particular, the inclined surface portion 7502 is located between the annular surface portion 7501 and the optical effective portion 7400. Thus, there is a step between the optical effective portion 7400 and the annular surface portion 7501 due to the configuration of the inclined surface portion 7502.

Accordingly, the light ray passes through the incident surface 7100 of the optical path folding element 7000, which is located in the object-end portion 111, to enter therein and is folded by 90 degrees using the path folding surface 7200. Then, the folded light ray departs from the optical path folding element 7000 through the exiting surface 7300 and then enters into the optical lens assembly 220, which is located in the tube portion 212. Finally, the light ray departs from the optical lens assembly 220 and passes through the image-end portion 213 to image on the image surface P.

The difference of the 7th example is that the central portion of the optical effective portion 6400 is a concave spherical surface. In addition, as shown in a partial enlarged view of FIG. 7, there are a plurality of engaging members 212a formed at a connection area between the tube portion 212 and the object-end portion 211 of the opaque member 210. Thus, the optical path folding element 7000 can be engaged with the engaging elements 212a through the step which is between the optical effective portion 7400 and the annular surface portion 7501. In particular, the aforementioned engaging element 212a can be but not limited to a protrusion. More particularly, the engaging elements 212a also can be an engaging structure having a square opening. Furthermore, the engaging elements 212a can be integrated with the opaque member 210. Preferably, an angle θ1 between the annular surface portion 7501 and the inclined surface portion 7502 is 115 degrees, and a width L1 of the inclined surface portion 7502 is 0.19 mm. Thus, the stability of the whole structure can be improved.

8th Example

Figure 8:
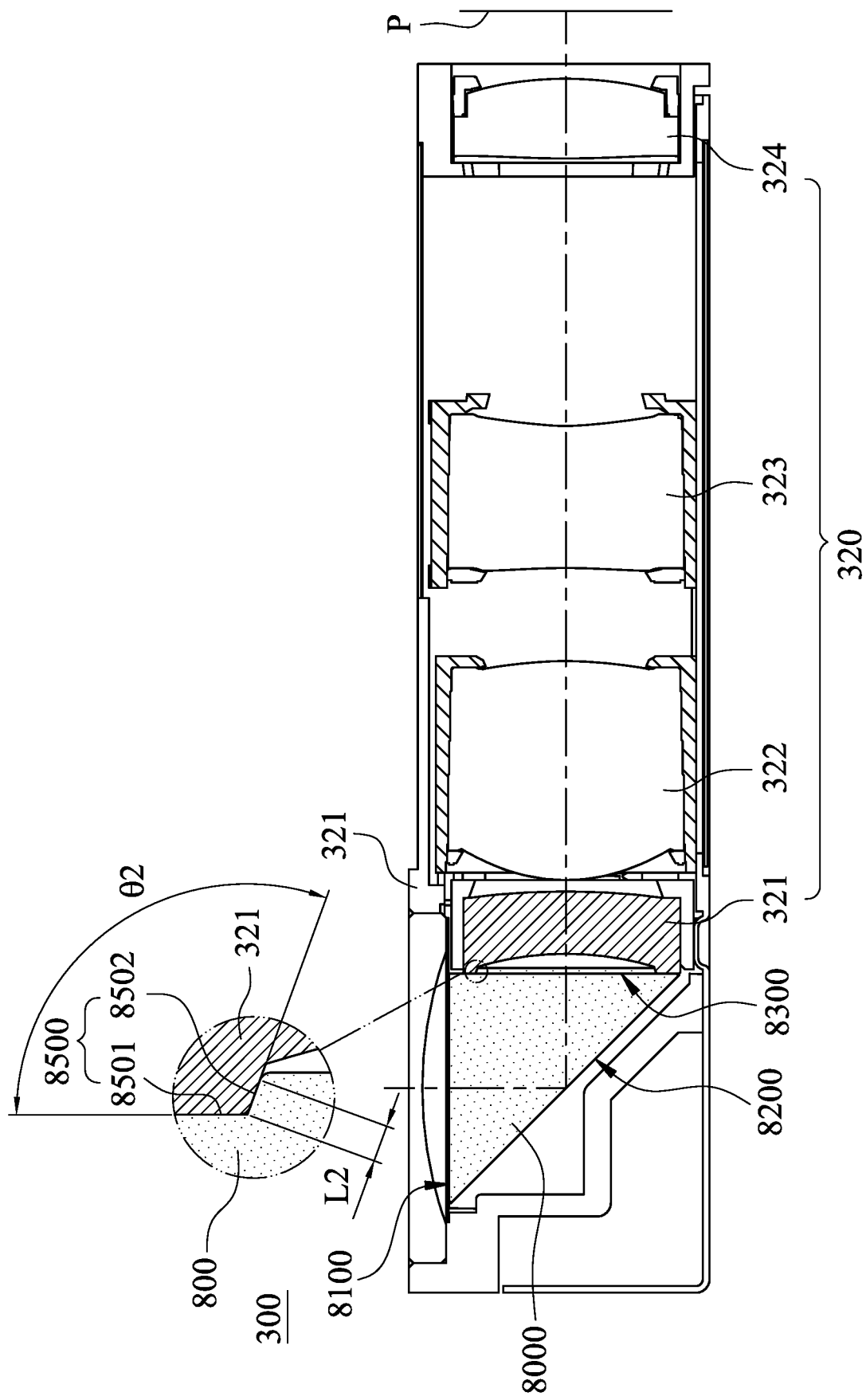
FIG. 8 is a cross-sectional view of an imaging lens module according to an 8th example of the present disclosure.

Please refer to FIG. 8, which is a cross-sectional view of an imaging lens module 300 according to an 8th example of the present disclosure. As shown in FIG. 8, the imaging lens module 300 includes a cover 310, an optical lens assembly 320 and an optical path folding element 8000. The optical lens assembly 320 and the optical path folding element 8000 are located inside the cover 310. In particular, the cover 310 is provided for protecting the assembled elements from being affected by the external environment.

In the 8th example, the optical lens assembly 320 includes four lens elements. In particular, the elements covered by the cover 310 of the imaging lens module 300 are, in order from an object side to an image side along an optical axis, the optical path folding element 8000, a first lens element 321, a second lens element 322, a third lens element 323 and a fourth lens element 324 of the optical lens assembly 320. The optical lens assembly 320 can include other optical elements (their reference numerals are omitted), such as spacers, light blocking sheets and so on.

According to FIG. 8, the structure of the optical path folding element 8000 of the 8th example is approximately the same with the 4th example. That is, the optical path folding element 8000 is a triangular prism and includes an incident surface 8100, a path folding surface θ200 and an exiting surface 8300. Moreover, the exiting surface 8300 of the optical path folding element 8000 includes an optical effective portion 8400 and an engaging structure 8500. The engaging structure 8500 includes an annular surface portion 8501 and a conical surface 8502. In particular, the conical surface 8502 is located between the annular surface portion 8501 and the optical effective portion 8400. Thus, there is a step between the optical effective portion 8400 and the annular surface portion 8501 due to the configuration of the conical surface 8502.

Accordingly, the light ray passes through the incident surface 8100 to enter the optical path folding element 8000 and is folded by 90 degrees using the path folding surface θ200. Then, the folded light ray departs from the optical path folding element 8000 through the exiting surface 8300 and then enters into the optical lens assembly 320. Finally, the light ray departs from the optical lens assembly 320 to image on the image surface P.

In the 8th example, the optical path folding element 6000 is engaged with the opaque member 110 of the imaging lens module 100. However, in the 8th example, the optical path folding element 8000 is engaged with the first lens element 321 of the optical lens assembly 320. In details, another engaging structure (not shown herein) can be further formed in an off-axial region of the first lens element 321 to be engaged with the engaging structure 8500 of the optical path folding element 8000 for fixing the optical path folding element 8000.

As shown in a partial enlarged view of FIG. 8, the first lens element 321 is a concave lens element. In addition, the first lens element 321 can be fixed in the cover 310 by the structural design of the cover 310. Thus, the optical path folding element 8000 leans against two sides of the concave surface of the first lens element 321 by the step, which is between the optical effective 8400 and the annular surface portion 8501, for fixing. In particular, an angle θ2 between the annular surface portion 8501 and the conical surface 8502 is 105 degrees, and a width L2 of the conical surface 8502 is 0.11 mm. Thus, the stability of the whole structure can be improved.

9th Example

Figure 9:
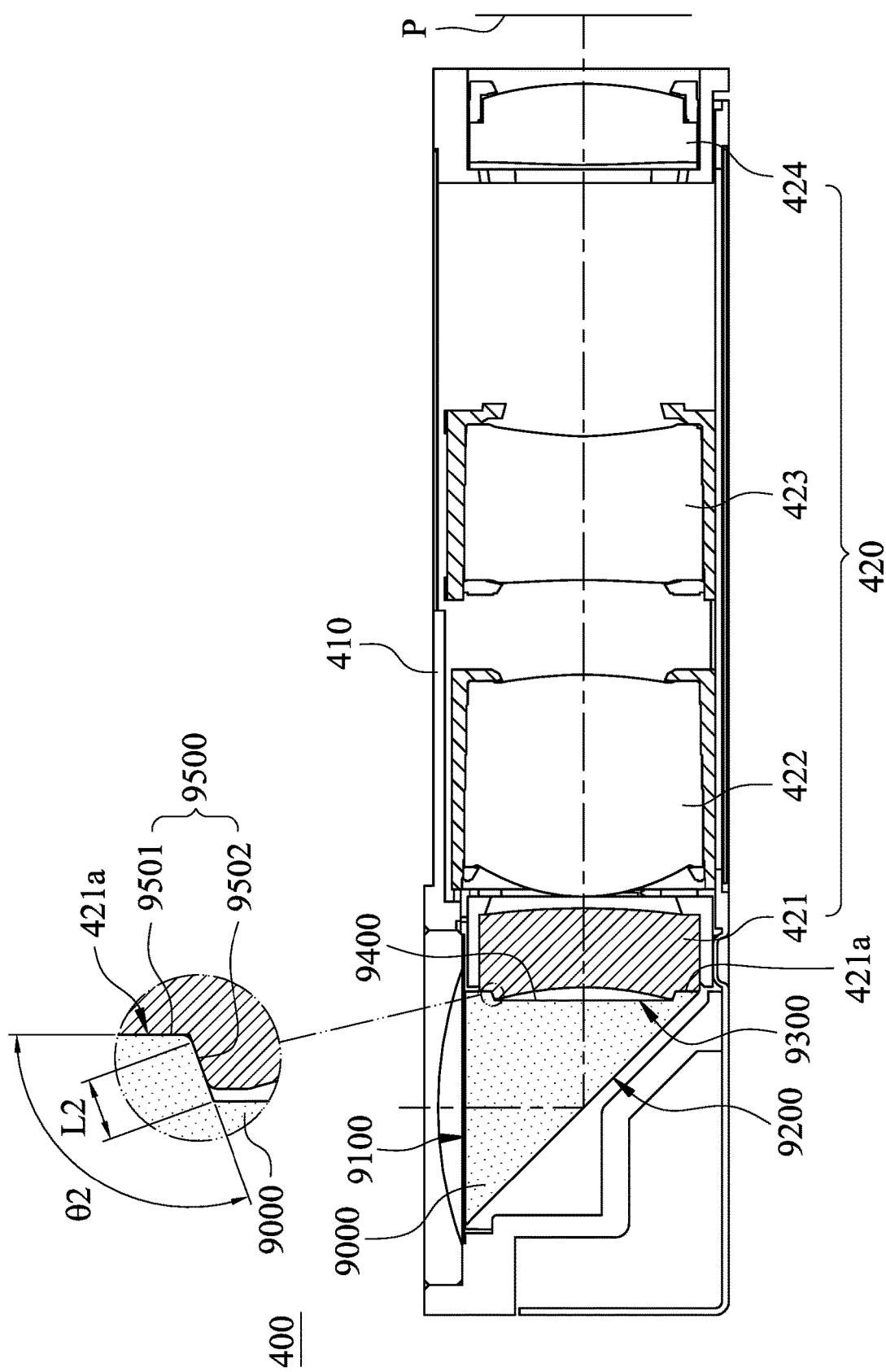
FIG. 9 is a cross-sectional view of an imaging lens module according to a 9th example of the present disclosure.

Please refer to FIG. 9, which is a cross-sectional view of an imaging lens module 400 according to a 9th example of the present disclosure. As shown in FIG. 9, the imaging lens module 400 can include a cover 410, an optical lens assembly 420 and an optical path folding element 9000. The optical lens assembly 420 and the optical path folding element 9000 are located inside the cover 410. In particular, the cover 410 is provided for protecting the assembled elements from being affected by the external environment.

In the 9th example, the optical lens assembly 420 includes four lens elements. In particular, the elements covered by the cover 410 of the imaging lens module 400 are, in order from an object side to an image side along an optical axis, the optical path folding element 9000, a first lens element 421, a second lens element 422, a third lens element 423 and a fourth lens element 424 of the optical lens assembly 420. The optical lens assembly 420 can include other optical elements (their reference numerals are omitted), such as spacers, light blocking sheets and so on.

According to FIG. 9, the structure of the optical path folding element 9000 of the 9th example is approximately the same with the 5th example. That is, the optical path folding element 9000 is a triangular prism and includes an incident surface 9100, a path folding surface 9200 and an exiting surface 9300. Moreover, the exiting surface 9300 of the optical path folding element 9000 includes an optical effective portion 9400 and an engaging structure 9500. The engaging structure 9500 includes an annular surface portion 9501 and a conical surface 9502. It is noted that, in the 9th example, the optical effective portion 9400 and the conical surface 9502 are recessed into the exiting surface 9300.

Accordingly, the light ray passes through the incident surface 9100 to enter the optical path folding element 9000 and is folded by 90 degrees using the path folding surface 9200. Then, the folded light ray departs from the optical path folding element 9000 through the exiting surface 9300 and then enters into the optical lens assembly 420. Finally, the light ray departs from the optical lens assembly 420 to image on the image surface P.

In the 9th example, the optical path folding element 9000 is engaged with the first lens element 421 of the optical lens assembly 420 as same as the 8th example. However, an annular notch 421a is formed in the off-axial region (that is, the two sides of the concave surface) of the lens element although the first lens element 421 is also a concave lens element as same as the 8th example. As shown in a partial enlarged view of FIG. 9, the optical path folding element 9000 is engaged with the annular notch 421a of the first lens element 421 by the step, which is between the optical effective 9400 and the annular surface portion 9501, for fixing. In details, the step is able to be cooperated with the annular notch 421a because the conical surface 9502 is the closed ring. In particular, an angle θ2 between the annular surface portion 9501 and the conical surface 9502 is 115 degrees, and a width L2 of the conical surface 9502 is 0.19 mm. Thus, the stability of the whole structure can be improved.

10th Example

Figure 10:
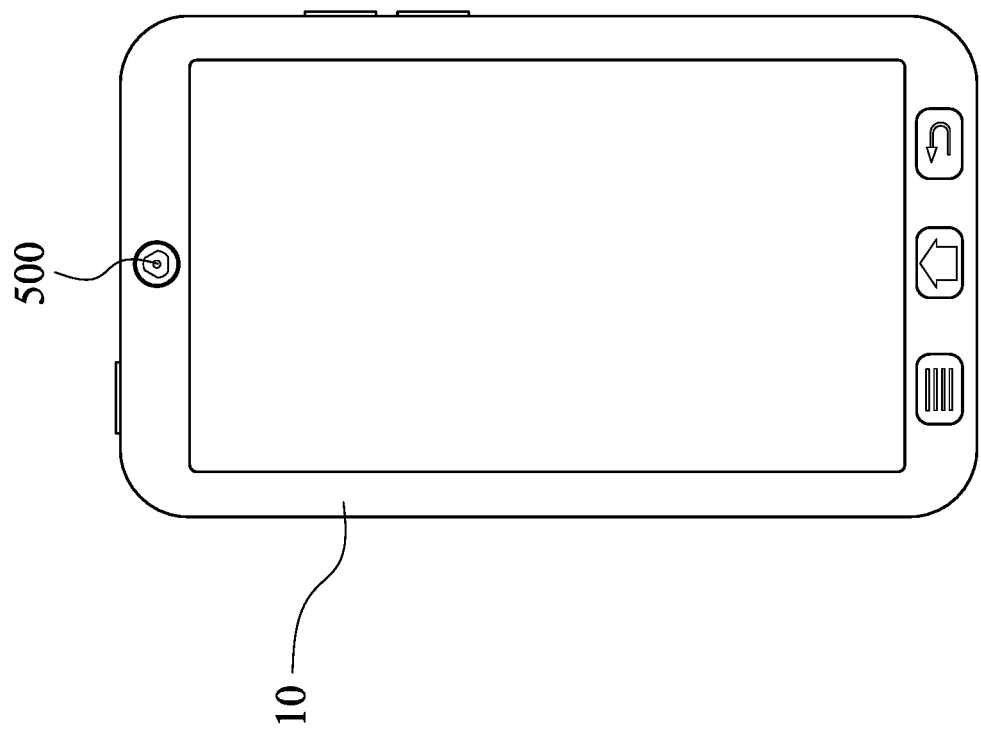
FIG. 10 is a schematic view of an electronic device according to a 10th example of the present disclosure.

Please refer to FIG. 10, which is a schematic view of an electronic device 10 according to a 10th example of the present disclosure. The electronic device 10 of the 10th embodiment is a smart phone and includes an imaging lens module 500. The imaging lens module 500 can be the abovementioned imaging lens module according to any of the 6th example, the 7th example, the 8th example and the 9th example. The imaging lens module 500 includes an optical path folding element (not shown herein) according to the present disclosure. Therefore, it is favorable for enhancing the image quality so as to satisfy the requirements of high-end optical systems with camera functionalities. Furthermore, the electronic device 10 can further include an image sensor (not shown herein), in which the image sensor is disposed on an image surface (not shown herein) of the imaging lens module 500. Preferably, the electronic device 10 can further include but not limited to a display, a control unit, a storage unit, a random access memory unit (RAM), a read-only memory unit (ROM) or a combination thereof.

11th Example

Figure 11:
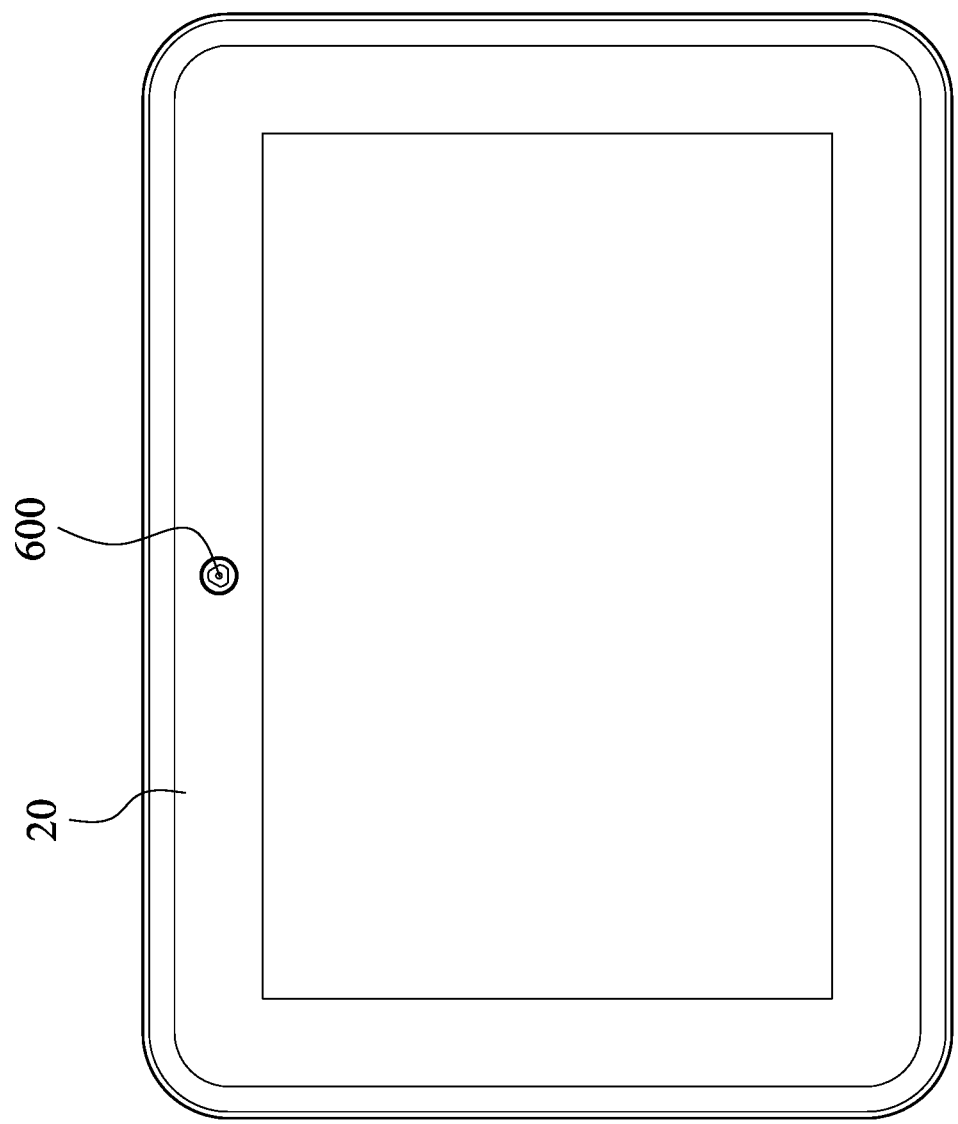
FIG. 11 is a schematic view of an electronic device according to an 11th example of the present disclosure.

Please refer to FIG. 11, which is a schematic view of an electronic device 20 according to an 11th example of the present disclosure. The electronic device 20 of the 11th example is a tablet. The electronic device 20 includes an imaging lens module 600. The imaging lens module 600 can be the abovementioned imaging lens module according to any of the 6th example, the 7th example, the 8th example and the 9th example. The imaging lens module 600 includes an optical path folding element (not shown herein) according to the present disclosure.

12th Example

Figure 12:
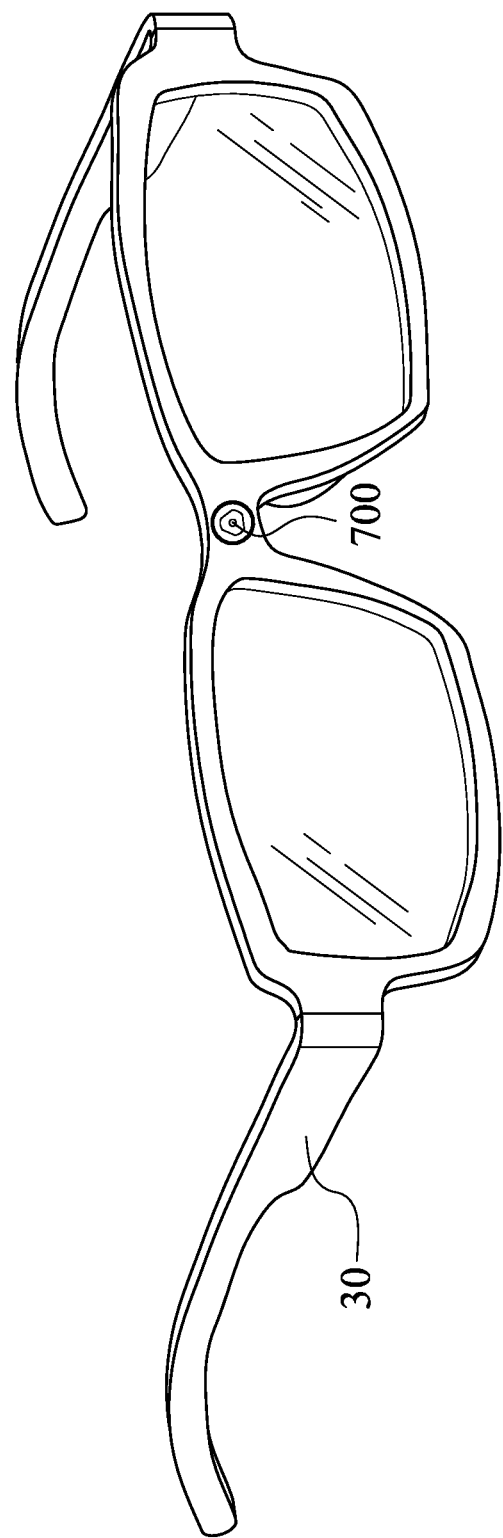
FIG. 12 is a schematic view of an electronic device according to a 12th example of the present disclosure.

Please refer to FIG. 12, which is a schematic view of an electronic device 30 according to a 12th example of the present disclosure. The electronic device 30 of the 12th example is a wearable device. The electronic device 30 includes an imaging lens module 700. The imaging lens module 700 can be the abovementioned imaging lens module according to any of the 6th example, the 7th example, the 8th example and the 9th example. The imaging lens module 700 includes an optical path folding element (not shown herein) according to the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical path folding element, comprising:
an incident surface allowing a light ray to pass into the optical path folding element;
a path folding surface folding the light ray from the incident surface; and
an exiting surface allowing the light ray to pass through and depart from the optical path folding element;
wherein at least one of the incident surface and the exiting surface comprises:
an optical effective portion; and
at least one engaging structure surroundingly disposed around the optical effective portion and comprising:
an annular surface portion surrounding the optical effective portion; and
an inclined surface portion located between the annular surface portion and the optical effective portion;
wherein an Abbe number of the optical path folding element is V, and the following condition is satisfied:
V<32.0.

2. The optical path folding element of claim 1, wherein the optical path folding element is made of a plastic material.

3. The optical path folding element of claim 2, wherein the path folding surface comprises an aluminum metallic layer covered thereon.

4. The optical path folding element of claim 2, wherein a width of the inclined surface portion is L1, and the following condition is satisfied:
0.07 mm<L1<0.35 mm.

5. The optical path folding element of claim 2, wherein the light ray is folded by 90 degrees when passing through the path folding surface.

6. The optical path folding element of claim 2, wherein a distance between a center of the incident surface and a center of the path folding surface is equal to a distance between the center of the path folding surface and a center of the exiting surface.

7. The optical path folding element of claim 2, wherein an area occupied by the optical effective portion is equal to or more than 40% of a total area of the incident surface or the exiting surface.

8. An imaging lens module, comprising:
the optical path folding element of claim 1.

9. The imaging lens module of claim 8, wherein the imaging lens module comprises at least one lens element, and the lens element is engaged with the engaging structure.

10. The imaging lens module of claim 8, wherein the imaging lens module comprises at least one opaque member, and the opaque member is engaged with the engaging structure.

11. An electronic device, comprising:
the imaging lens module of claim 8.

12. An optical path folding element, comprising:
an incident surface allowing a light ray to pass into the optical path folding element;
a path folding surface folding the light ray from the incident surface; and
an exiting surface allowing the light ray to pass through and depart from the optical path folding element;
wherein at least one of the incident surface and the exiting surface comprises:
an optical effective portion; and
at least one engaging structure symmetrically disposed around the optical effective portion and comprising:
an annular surface portion surrounding the optical effective portion; and
a conical surface located between the annular surface portion and the optical effective portion;
wherein an Abbe number of the optical path folding element is V, and the following condition is satisfied:
V<32.0.

13. The optical path folding element of claim 12, wherein the optical path folding element is made of a plastic material.

14. The optical path folding element of claim 12, wherein the conical surface is a closed ring.

15. The optical path folding element of claim 12, wherein a width of the conical surface is L2, and the following condition is satisfied:
0.07 mm<L2<0.35 mm.

16. The optical path folding element of claim 12, wherein the Abbe number of the optical path folding element is V, and the following condition is satisfied:
V<25.0.

17. The optical path folding element of claim 12, wherein the light ray is folded by 90 degrees when passing through the path folding surface.

18. The optical path folding element of claim 12, wherein a distance between a center of the incident surface and a center of the path folding surface is equal to a distance between the center of the path folding surface and a center of the exiting surface.

19. An imaging lens module, comprising:
the optical path folding element of claim 12.

20. An electronic device, comprising:
the imaging lens module of claim 19.

* * * * *